(No Model.)
L. THIERRY.
VEHICLE CHAFE IRON.
No. 476,577. Patented June 7, 1892.
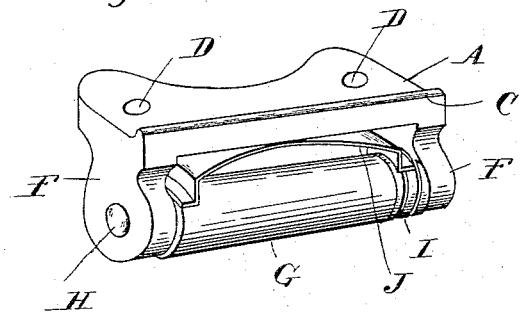
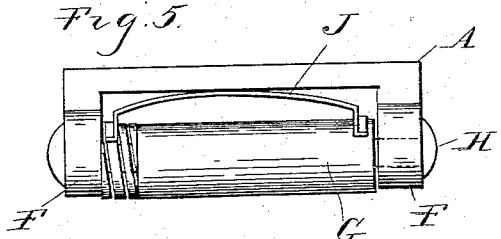
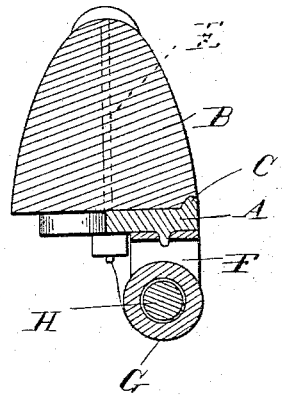
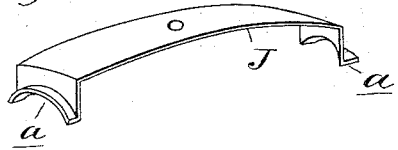
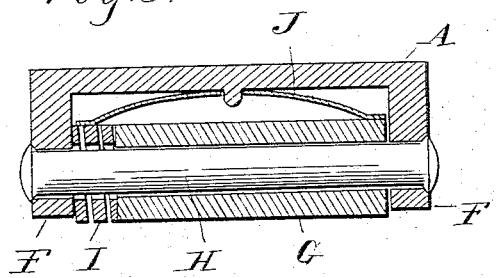
Witnesses
A. L. Hobbe
M&O Dogherty
Inventor
Louis Thierry
By Tho. S. Sprague & Son
Atty's

UNITED STATES PATENT OFFICE.

LOUIS THIERRY, OF DETROIT, MICHIGAN.

VEHICLE CHAFE-IRON.

SPECIFICATION forming part of Letters Patent No. 476,577, dated June 7, 1892.

Application filed March 18, 1892. Serial No. 425,397. (No model.)

*To all whom it may concern:*

Be it known that I, LOUIS THIERRY, a citizen of the United States, residing at Detroit, in the county of Wayne and State of Michigan, have invented certain new and useful Improvements in Vehicle Chafe-Irons, of which the following is a specification, reference being had therein to the accompanying drawings.

This invention relates to new and useful improvements in vehicle chafe-irons; and it consists in the peculiar and novel construction of a rolling chafe-iron and in the peculiar provision made for preventing the rattling.

The use of a chafe-iron in vehicles is well-known for protecting certain parts from abrasion by the front wheels in turning; but the present construction often forms a source of danger when turns are made too abruptly by binding the wheel, so that there is a liability of upsetting the vehicle. To prevent this my invention consists in making a chafe-iron so that it will roll freely when contacted by the wheel in turning, whereby the danger of upsetting is avoided, and, further, in certain anti-rattling provisions, whereby it will not become a nuisance when not in use.

The drawings which accompany this specification show my device, in Figure 1, in perspective detached; in Fig. 2, in a central cross-section as attached to a side-bar vehicle; in Fig. 3, in a vertical central longitudinal section, and in Fig. 4 in detached perspective view of one of the anti-rattling springs. Fig. 5 is a side elevation.

A is the frame of the device, which consists of a bed-plate of suitable shape to attach to the under side of a vehicle-body or to the side bar B, as the case may be. Preferably a ledge C is formed as an abutment against the corner or side bar of the body, and holes D are provided for securing the device by means of the bolts E. This frame is provided with the downwardly-projecting ears F, which overhang the edge of the ledge C of the body and in which the roller G is journaled in any suitable manner, such as by means of the bolt H, which may be firmly secured by riveting or in any other manner to securely fasten it in position.

The roller G may be made of a piece of pipe and preferably of hardened material shorter than the longitudinal distance between the ears F, whereby space is obtained to sleeve upon the bolt H at one end of the roller a coil-spring I, which is normally under compression, so as to crowd the roller between the bearings and effectively prevent any possibility of rattling. A bent leaf-spring J is secured in the space between the frame and the top of the roller in such a manner as to bear with its ends at one end against the roller and at the other end against the coil-spring. This spring is preferably made as shown in the detached view, Fig. 4, wherein the ends are shown provided with curved flanges $a$, corresponding in shape to the shape of the roller and coil-spring. This spring J is under sufficient tension to prevent the rattling of the roller and spring upon the shaft H.

The device in operation is placed where it will be struck by the rim of the wheel in turning, so as to roll freely.

While I have shown and described my device of a specific form, it is obvious that to suit the different types of vehicles and the different positions in which it may be used the parts may be considerably modified. By making the leaf-spring J with curved bearing it prevents movement of the roller in any direction except endwise, and this movement is prevented by the coil-spring, thus absolutely preventing any possibility of rattling when in use.

What I claim as my invention is—

1. In a chafe-iron for vehicles, the combination, with a frame, of a shaft mounted therein, a roller on the shaft, and a spring on the frame between the same and the top of the roller, having its ends bent down and engaging the roller, substantially as described.

2. In a chafe-iron for vehicles, the combination, with a frame, of a shaft mounted therein, a roller on the shaft, a coiled spring sleeved on the shaft at the end of the roller, and a spring engaging the roller and coiled spring, substantially as described.

3. In a vehicle chafe-iron, the combination of the frame A, having the overhanging ears F, the roller G, the shaft H, upon which said roller is journaled, the coil-spring I at one end of said shaft, and the leaf-spring interposed between the frame and the roller, with means for securing the device to a vehicle, substantially as described.

In testimony whereof I affix my signature in presence of two witnesses.

LOUIS THIERRY.

Witnesses:
N. L. LINDOP,
M. B. O'DOGHERTY.